United States Patent [19]
Nakamura et al.

[11] Patent Number: 5,585,137
[45] Date of Patent: Dec. 17, 1996

[54] APPARATUS AND METHOD OF MANUFACTURING FIBER

[75] Inventors: Motonori Nakamura; Toshio Danzuka; Akira Inoue; Haruhiko Aikawa, all of Yokohama, Japan

[73] Assignee: Sumitomo Electric Industries, Ltd., Osaka, Japan

[21] Appl. No.: 398,417

[22] Filed: Mar. 3, 1995

[30] Foreign Application Priority Data

Mar. 3, 1994 [JP] Japan ..................................... 6-059946

[51] Int. Cl.⁶ ................. B05D 5/06; B05C 11/00; G03C 25/02
[52] U.S. Cl. ..................... 427/8; 427/9; 427/10; 427/163.2; 427/385.5; 427/407.1; 427/408.2; 427/434.7; 427/512; 118/405; 118/670; 118/690; 118/712; 118/718; 118/719
[58] Field of Search .................. 427/8–10, 163.2, 427/512, 385.5, 434.7, 249, 407.2; 118/670, 690, 712, 405, 718, 719, 407.1

[56] References Cited

U.S. PATENT DOCUMENTS

| | | | |
|---|---|---|---|
| 5,013,130 | 5/1991 | Atkins et al. | 350/96.3 |
| 5,057,781 | 10/1991 | Alkins et al. | 427/10 |
| 5,372,622 | 12/1994 | Alkins et al. | 427/10 |
| 5,393,557 | 2/1995 | Darling | 427/10 |

FOREIGN PATENT DOCUMENTS

| | | |
|---|---|---|
| 551241 | 3/1993 | Japan . |
| 5208850 | 8/1993 | Japan . |

Primary Examiner—Janyce Bell
Attorney, Agent, or Firm—Cushman, Darby & Cushman, IP Group of Pillsbury Madison & Sutro LLP

[57] ABSTRACT

An apparatus includes a first waveguide having a first surface having a first hole through which a fiber passes, and a second surface having a second hole through which an object passes and opposing the first surface, a magic tee connected to the first waveguide, and an adjustable short plunger connected to the magic tee.

12 Claims, 13 Drawing Sheets

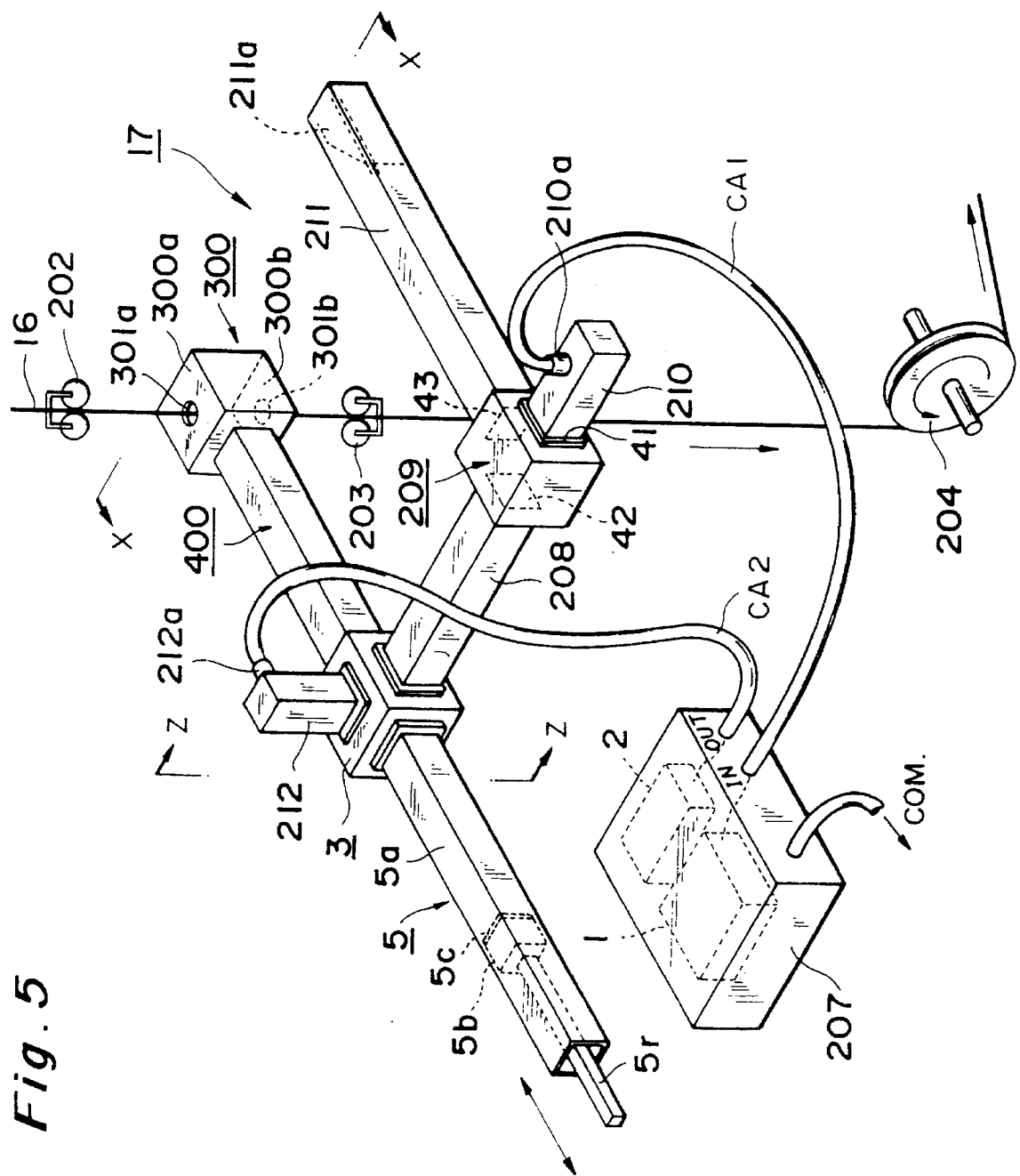

APPARATUS AND METHOD OF MANUFACTURING FIBER

The priority application, Japanese Application No. 6-59946 (59946/1994), filed in Japan on Mar. 3, 1994 is hereby incorporated by reference into the present specification.

BACKGROUND OF THE INVENTION

1. Field of the Invention

The present invention relates to an apparatus for manufacturing a fiber, a method of monitoring the characteristics of a fiber, and a method of manufacturing a fiber while monitoring the characteristics of the fiber and, more particularly, to an apparatus and method of manufacturing a carbon-coated optical fiber.

2. Related Background Art

In the conventional manufacture of an optical fiber, a process for coating a glass fiber with carbon is known. A method of manufacturing a carbon-coated fiber is described in U.S. Pat. No. 5,013,130, or Japanese Patent Laid-Open No. 5-51241 or 5-208850.

SUMMARY OF THE INVENTION

The present invention relates to an apparatus and method of measuring the characteristics of an object. The apparatus comprises: a first waveguide having a hole through which an object passes; a magic tee connected to the first waveguide; and an adjustable short plunger connected to the magic tee. This apparatus is used to evaluate the characteristics of a carbon-coated optical fiber.

A carbon-coated optical fiber is inserted into the hole of the first waveguide. This optical fiber is wound up by a winding up reel. When a microwave is guided into the magic tee, this microwave is branched in the magic tee and guided into the adjustable short plunger and the first waveguide. The carbon-coated optical fiber is a fiber having a carbon film coated on a glass fiber. The branched microwave is influenced by the carbon film. Because the adjustable short plunger is connected to the magic tee, the characteristics of the optical fiber coated with the carbon film can be precisely measured by the apparatus.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a perspective view showing an apparatus using a cavity resonator;

DESCRIPTION OF THE PREFERRED EMBODIMENTS

Figure 1:
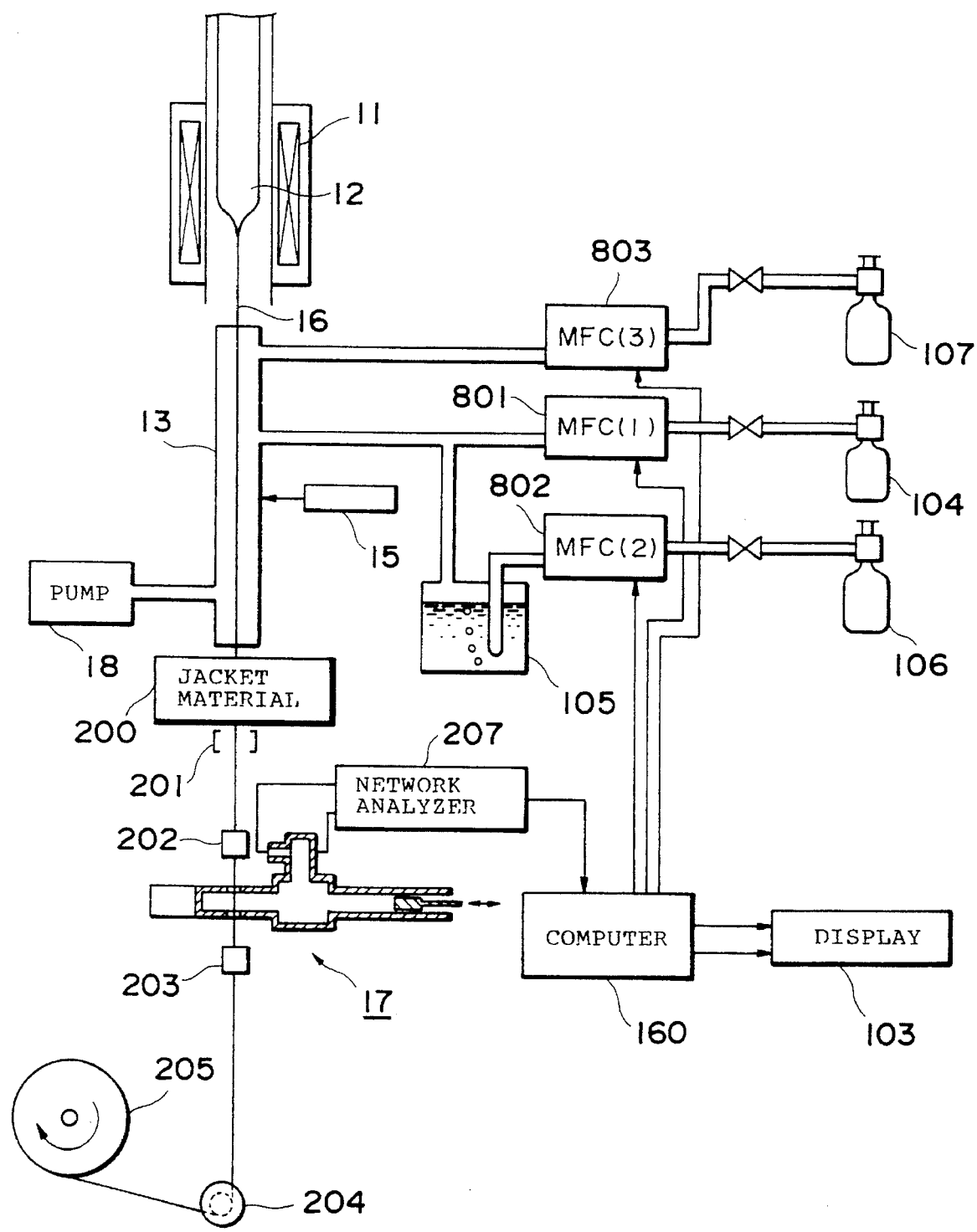
FIG. 1 is a view showing a system for manufacturing an optical fiber.
Figure 2:
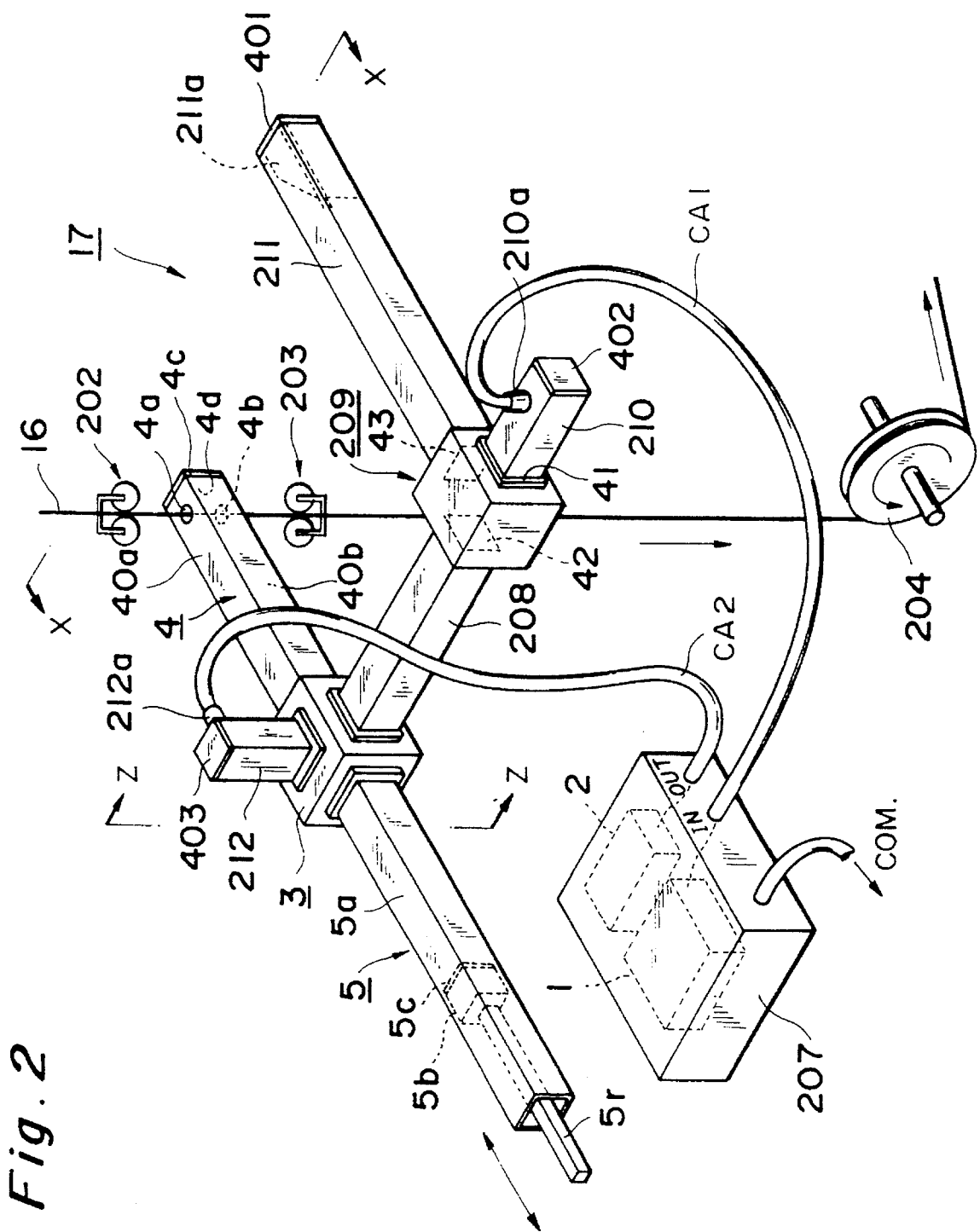
FIG. 2 is a perspective view showing an apparatus for monitoring the characteristics of a fiber.
Figure 3:
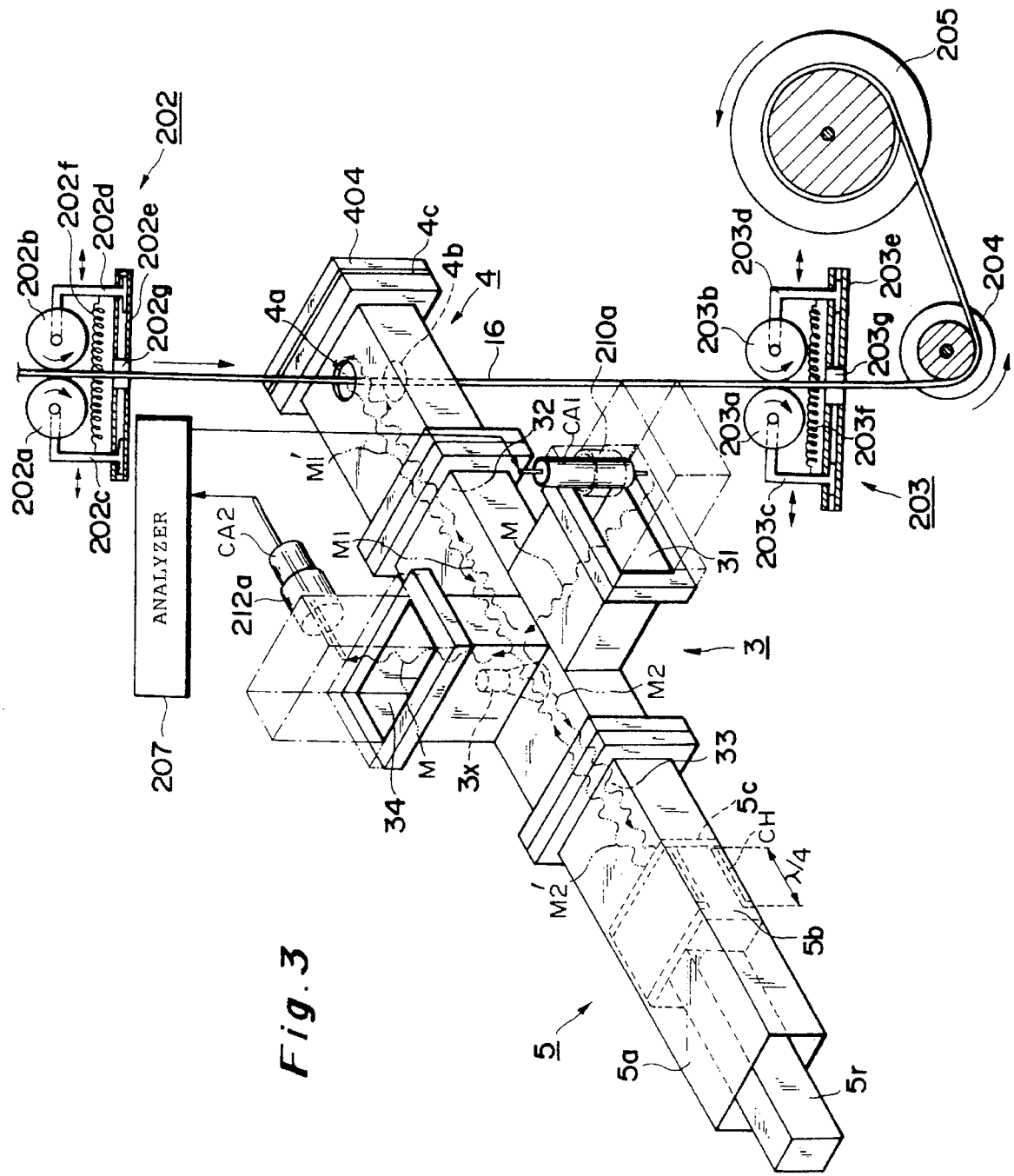
FIG. 3 is a perspective view for explaining the apparatus shown in FIG. 2 in more detail.
Figure 4A:
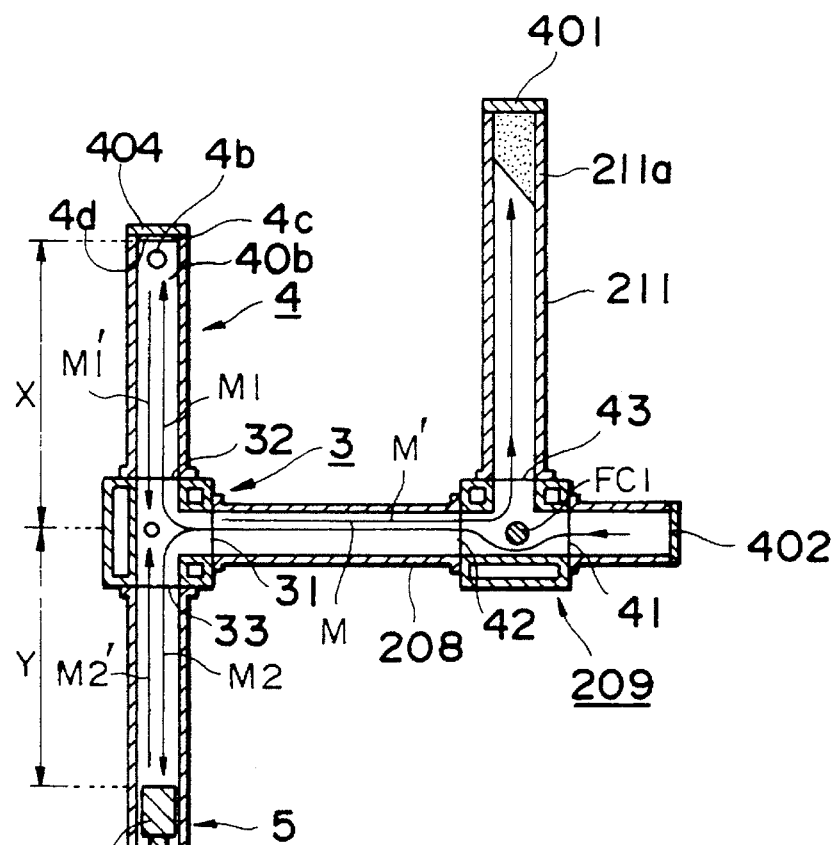
FIG. 4A is a sectional view of the apparatus shown in FIG. 2 along an arrow X—X.
Figure 4B:
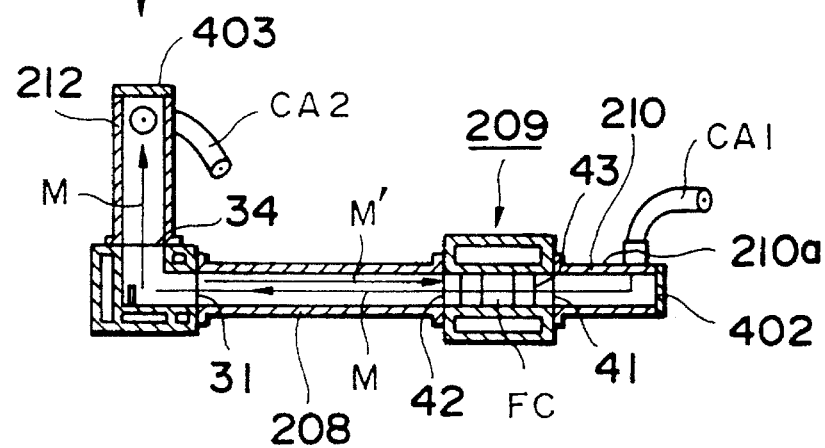
FIG. 4B is a sectional view of the apparatus shown in FIG. 2 along an arrow Z—Z.
Figure 18A:
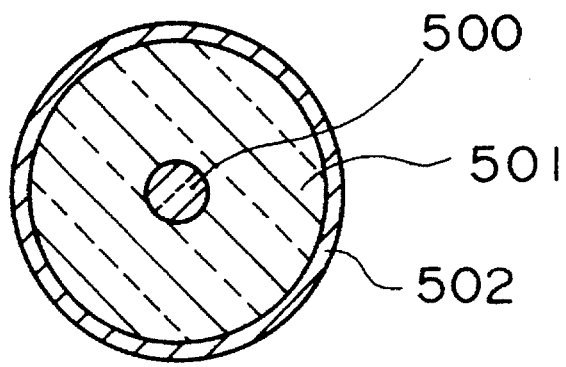
FIG. 18A shows a carbon-coated fiber.
Figure 18B:
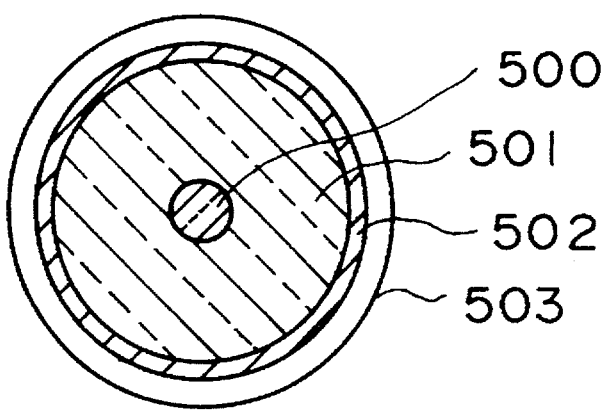
FIG. 18B shows a jacket-coated fiber.

FIG. 1 is a view showing an apparatus for manufacturing an optical fiber. A fiber preform 12 is drawn into a glass fiber 16 in a heater 11. The drawn optical fiber 16 is guided into a reaction furnace 13 for coating a carbon film, and the optical fiber 16 having the carbon film coated on a glass fiber is manufactured. FIG. 18A shows the carbon-coated fiber 16. The carbon-coated fiber 16 has a cladding 501, and a core 500 buried in the cladding 501, and carbon film 502 which covers the cladding 501. FIG. 18B shows jacket-coated fiber 16. The jacket-coated fiber 16 has a jacket(resin) 503 which coats the carbon film 502.

Source gases are supplied from gas tanks 104, 106, and 107 to the reaction furnace 13. An exhaust pump 18 communicates with the reaction furnace 13. The gas tank 104 is connected to the reaction furnace 13 through a first mass flow controller (MFC (1)) 801. The gas tank 106 is connected to the reaction furnace through a second mass flow controller (MFC (2)) 802 and a bubbler 105. The gas tank 105 is connected to the reaction furnace 13 through a third mass flow controller (MFC (3)) 803. The reaction gases from the tanks 104, 106, and 107 are mixed in the reaction furnace 13 to fabricate the carbon film 502 on the cladding 501. The control of the flow rate of the reaction gas is known in U.S. Pat. No. 5,013,130.

A moving mechanism 15 for vertically moving the reaction furnace 13 in FIG. 1 is provided to the reaction furnace 13. Movement of the moving mechanism 15 and supply of the source gases are controlled by a computer(type: NEC PC9801FA) 160.

For the optical fiber 16 passing through the reaction furnace, a resin (jacket) having photo-setting properties is coated on the carbon film by a jacket coating unit 200. The fiber 16 moves on thorough the jacket coating unit 200 having vessels which are filled with ultraviolet light curable liquid materials that are subsequently transformed into polymeric solids for jacketing the fiber 16. This resin is cured upon exposure by an ultraviolet irradiation unit 201. The optical fiber is guided into a monitoring apparatus 17. The monitoring apparatus 17 is arranged between a first fiber movement regulation mechanism 202 and a second fiber movement regulation mechanism 203. The monitoring apparatus 17 is connected to a network analyzer(type: HP8720C) 207. The network generator 207 is connected to the computer 160. The computer 160 outputs the measured characteristics of the carbon-coated fiber 16 to a display unit 103. The optical fiber 16 is wound on a winding up reel 205 through a pulley 204.

The monitoring apparatus 17 will be described below in more detail with reference to FIGS. 2, 3, 4A, and 4B.

This apparatus 17 has a first waveguide (microwave waveguide) 4. The first waveguide 4 has a first surface 40a having a first hole 4a through which the fiber 16 (object) passes, and a second hole 4b through which the fiber 16 passes. The first surface 40a and a second surface 40b oppose each other. A first silver film 4c is fixed on the inner wall of the first waveguide 4. The upper surface of the first silver film 4c is defined as a first end face 4d. The first waveguide 16 is sealed with a cover 404. The Ag film 4c coats the inner surface of the cover member 404.

The first waveguide 4 is connected to a magic tee 3. The magic tee 3 has four openings 31 to 34. The first waveguide 4 communicates with the magic tee 3 through the second opening 32 of the magic tee 3. The magic tee 3 has a conductor rod 3x in its inside.

An adjustable short plunger 5 is connected to the magic tee 3. The third opening 33 of the magic tee 3 communicates with the adjustable short plunger 5. The adjustable short plunger 5 has a short plunger waveguide 5a and an adjustable short plate 5b arranged in the waveguide 5a. The adjustable short plate 5b moves in the waveguide 5a while contacting the inner wall of the waveguide 5a. The adjustable short plate 5b has a second silver film 5c on a surface opposing the first silver film 4c. The adjustable short plate 5b uses a slot CH having a length of ¼ a wavelength. This choke CH is formed along the upper surface of the waveguide 5a. Note that a wavelength used in this apparatus is in a range from 24 to 33 mm. The frequency of a microwave guided in this apparatus 17 is 12 GHz. A first distance Y (cm) between the end face (Ag film 5c) of the adjustable short plate 5b and the conductor rod 3x, and a second distance X (cm) between the end face (Ag film 4c) and conductor rod 3x satisfies the following expression.

$$Y-5\ cm < X < Y+5\ cm$$

The first regulation means 202 regulates the movement of the fiber 16 along the first surface 40a. The second regulation means 203 regulates the movement of the fiber 16 along the first surface 40a. The first waveguide 4 is arranged between the first regulation means 202 and the second regulation means 203. Therefore, the fiber 16 passing through the holes 4a and 4b only vertically moves in the hole 4a.

The first regulation means 202 has two rollers 202a and 202b rotatable while sandwiching the fiber 16 therebetween, arms 202c and 202d for supporting the rollers 202a and 202b, respectively, a base plate 202e slidably attached to the arms 202c and 202d, and a tensile spring 202f for connecting the rollers 202a and 202b. The base plate 202e has a hole 202g through which the fiber 16 passes.

The second regulation means 203 has two rollers 203a and 203b rotatable while sandwiching the fiber 16 therebetween, arms 203c and 203d for supporting the rollers 203a and 203b, respectively, a base plate 203e slidably attached to the arms 203c and 203d, and a tensile spring 203f for connecting the rollers 203a and 203b. The base plate 203e has a hole 203g through which the fiber 16 passes.

The magic tee 3 is connected to a circulator 209 through a connecting waveguide 208. The circulator 209 has first to third openings 41 to 43. The circulator 209 includes a ferrite core FC1 therein. The circulator 209 is connected to the magic tee 3 through the second opening 42. The magic tee 3 communicates with the connecting waveguide 208 through the first opening 31. The connecting waveguide 208 communicates with the circulator 209 through the second opening 42.

A microwave supplied to the circulator 209 through the first opening 41 is externally output only through the second opening 42 while a microwave supplied to the circulator 209 through the second opening 42 is externally output through only the third opening 43.

An input waveguide 210 communicates with the circulator 209 through the first opening 41 of the circulator 209. An input terminal 210a is attached to the input waveguide 210. The input waveguide 210 is sealed with a cover member 402.

An absorbing waveguide 211 is connected to the circulator 209 through the third opening 43. A matched termination 211a is arranged in the absorbing waveguide 211. The absorbing waveguide 211 is sealed with a cover member 401.

A microwave M supplied from the input terminal 210a into the input waveguide 210 is guided into the circulator 209 through the first opening 41 of the circulator 209. The microwave M is guided into the magic tee 3 through the second opening 42 of the circulator 209. The reflected wave M' of the microwave, which is supplied from the magic tee 3 to the circulator 209 through the second opening 42 of the circulator 209, is guided into the absorbing waveguide 211 through the third opening 43 of the circulator 209. The reflected wave M' of the microwave, which is guided into the absorbing waveguide 211, is absorbed by the matched termination 211a.

The apparatus 17 has an output waveguide 212 attached to the magic tee 3. An output terminal 212a is attached to the output waveguide 212. The output waveguide 212 is sealed with a cover member 403.

An analyzer 207 is connected to the apparatus 17. This analyzer 207 is the network analyzer available from Hewlett Packard. The analyzer 207 supplies a microwave to the input terminal 210a and extracts a signal related to the characteristics of the fiber 16 from the output terminal 212a.

A microwave M supplied from the analyzer 207 into the input waveguide 210 through the input terminal 210a is guided into the magic tee 3 through the circulator 209. The microwave M guided into the magic tee 3 is branched into a first microwave M1 and a second microwave M2 in the magic tee 3. The first microwave M1 is guided into the first waveguide 4 while the second microwave M2 is guided into the adjustable short plunger 5.

The first microwave M1 is reflected by the first end face 4d (silver film 4c) in the first waveguide 4 while the second microwave M2 is reflected by the adjustable end face 5c in the adjustable short plunger 5. The first and second silver films 4c and 5c are arranged to sandwich a space where the fiber 16 is arranged.

The first microwave M1 reflected by the first end face 4d (Ag film 4c) and the second microwave M2 reflected by the adjustable end face 5c are superposed in the magic tee 3. The superposed microwave M is supplied to the analyzer 207 through the output waveguide 212 and the output terminal 212a. The analyzer 207 incorporates an oscillator 1 for generating a microwave and a detector 2 for detecting a microwave. The analyzer 207 and the input terminal 210a is connected through an input cable CA1. The analyzer 207 and the output terminal 212a is connected through an output cable CA1. The cables CA1 and CA2 are coaxial cables.

Figure 6A:
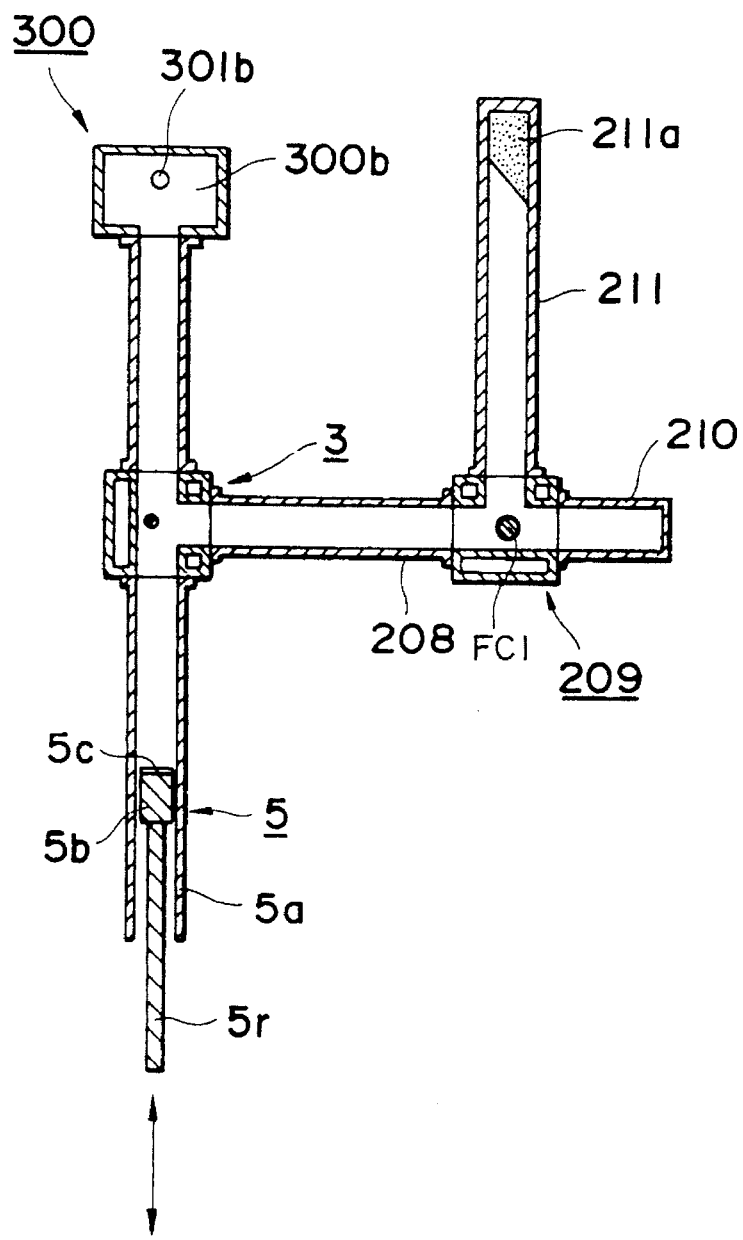
FIG. 6A is a sectional view of the apparatus shown in FIG. 5 along an arrow X—X.
Figure 6B:
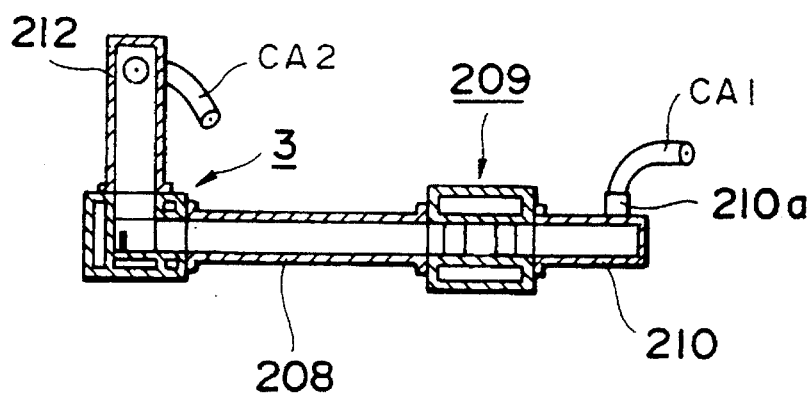
FIG. 6B is a sectional view of the apparatus shown in FIG. 5 along an arrow Z—Z.

An embodiment using a cavity resonator 300 will be described below with reference to FIGS. 5, 6A, and 6B. This apparatus is used in place of the apparatus 17 shown in FIG. 1. This apparatus uses a first waveguide 400 and the cavity resonator 300 attached to the first waveguide 400 in place of the first waveguide 4 shown in FIG. 1. The remaining constituent elements in FIG. 5 are the same as those shown in FIG. 1.

The cavity resonator 300 has a first surface 300a having a first hole 301a through which a fiber 16 passes, and a second surface 300b having a second hole 301b through which the fiber 16 passes and opposing the first surface 300a.

The cavity resonator 300 communicates with the first waveguide 400. The first waveguide 400 communicates with a magic tee 3. An adjustable short plunger 5, a connecting waveguide 208, and a circulator 209 are the same as those shown in FIG. 1.

The apparatus of the present invention will be further described below.

Figure 7:
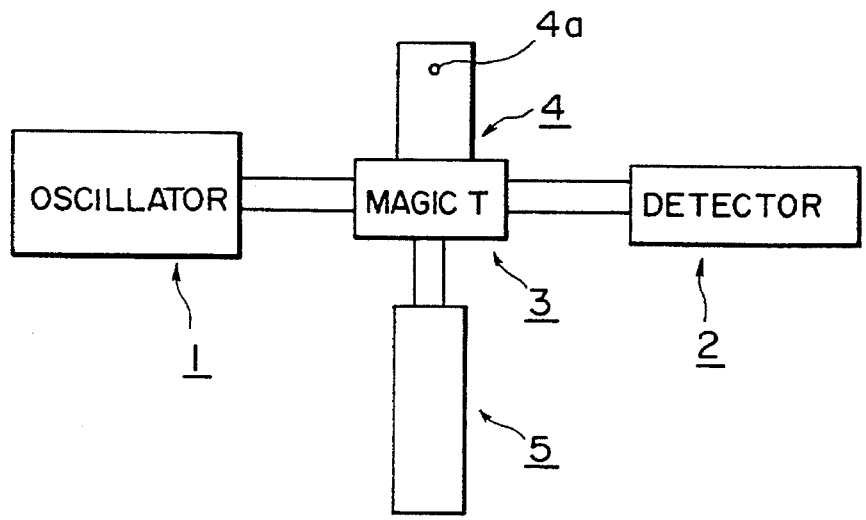
FIG. 7 is a view schematically showing the apparatus shown in FIG. 1.
Figure 9A:
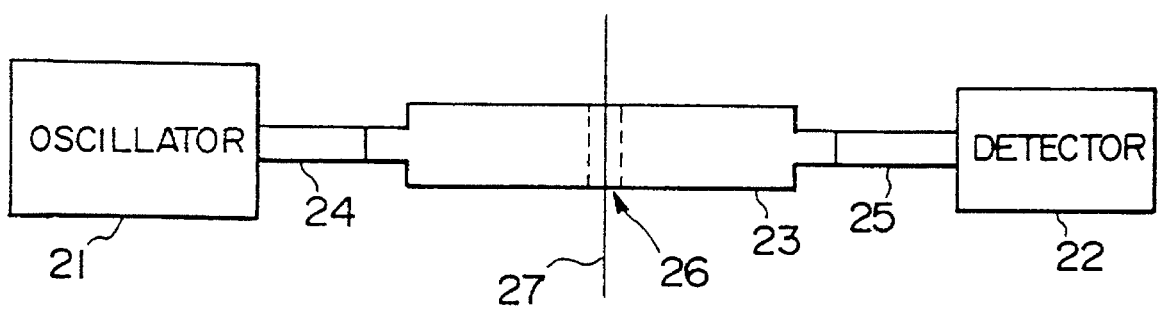
FIG. 9A is a view showing an apparatus according to a comparative example.
Figure 9B:
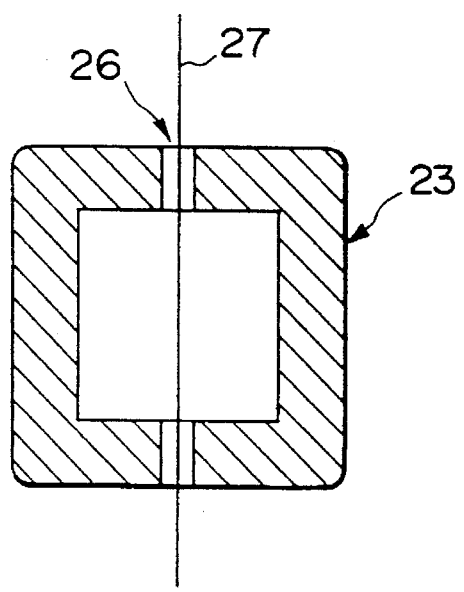
FIG. 9B is a view showing part of the apparatus shown in FIG. 9A.

FIG. 7 is a view schematically showing the arrangement of the embodiment of the carbon-coated optical fiber monitoring apparatus shown in FIG. 1. Referring to FIG. 7, this apparatus has the oscillator 1, detector 2, magic tee 3, waveguide 4, and adjustable reflection end 5. A microwave oscillated by the oscillator 1 is branched in two directions, i.e., toward the waveguide 4 and the adjustable reflection end 5, in the magic tee 3. The waveguide 4 has the optical fiber guide hole 4a for receiving a carbon-coated optical fiber 16. FIG. 9A and FIG. 9B show an apparatus according to a comparative example. The apparatus shown in FIG. 9A and 9B has a oscillator 21, a detector 22, a waveguide 23, cables 24 and 25, an introducing hole 26 through which a carbon-coated fiber 27 is introduced.

An end of the waveguide 4 opposite to that connected to the magic tee 3 is sealed by the conductor plate 404 to serve as a reflection end. Microwaves M1' and M2' reflected by the waveguide 4 and the adjustable reflection end 5 (see FIG. 3) are synthesized in the magic tee 3 and guided to the detector 2 in the analyzer 207.

A monitor method will now be described. The adjustable reflection end 5 is adjusted such that the standing wave of a microwave is generated in the bridge of a microwave circuit and an output from the detector becomes zero. With this adjustment, the phases of the waves reflected from the waveguide 4 and the adjustable reflection end 5 are reversed to cancel the reflected waves, so that the microwave synthesized in the magic tee 3, as an output to the detector 2, becomes zero.

To adjust the adjustable reflection end 5, a method can be used in which the phase of a microwave reflected by the adjustable reflection end 5 is adjusted, or the length of the waveguide constituting the adjustable reflection end 5 is adjusted.

In this adjustment, an optical fiber without a carbon film 502 is inserted in the optical fiber guide hole of the waveguide 4 first, and in this state, the adjustable reflection end 5 is adjusted.

After adjustment of the adjustable reflection end 5, the carbon-coated optical fiber having a carbon film formed on the surface of the optical fiber is inserted in the optical fiber guide hole 4a, 4b of the waveguide 4. An output from the magic tee 3 at this time is detected by the detector 2. Upon insertion of the carbon film 502 as a conductor, a microwave dielectric loss is generated. The loss amount caused by the carbon film 502 causes unbalance in the magic tee 3 and is detected as an output to the detector 2. When a detection value by the detector 2 is defined as P (dB), a dielectric loss W caused by the carbon film is given by the following equation:

$$W = 10^{-P/20}$$

The dielectric loss W is calculated by CPU (not shown) in the computer 160. The calculated dielectric loss is excellent in correlation with the hydrogen resistance characteristics of the carbon-coated optical fiber 16. Additionally, if the dielectric loss obtained by this monitor method is 1.4% or more, it is determined that the carbon-coated optical fiber 16 is excellent in hydrogen resistance characteristics.

The microwave circuit described in FIG. 7 was constituted by using waveguides. In addition, a waveguide having an optical fiber guide hole 4a and 4b (see FIG. 2) and one end sealed by a conductor plate 404 was used as the waveguide 4 for receiving the optical fiber. These components were assembled and used as a monitor in the manufacturing process of an optical fiber 16 having a carbon film 502 formed by a carbon film formation unit. First of all, an optical fiber 16 without a carbon coating (glass fiber) was inserted in the optical fiber guide hole 4a and 4b of the waveguide 4, and the adjustable reflection end 5 was adjusted such that an output to the detector 2 became zero. Thereafter, sources gases were supplied to the carbon film formation unit, thereby coating a carbon film 502 on the glass surface of the optical fiber 16 (cladding 501). Immediately after supply of the source gases was started, monitor of an output to the detector was started.

Figure 10:
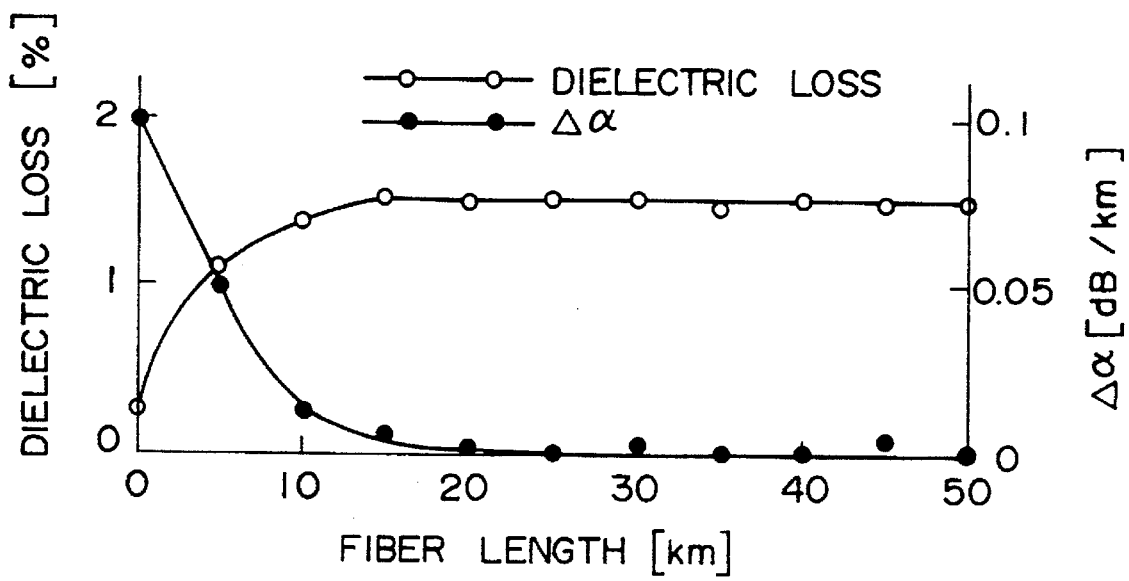
FIG. 10 is a graph showing the experimental result of the apparatus, shown in FIG. 1.

FIG. 10 shows the experimental result in which the monitor result of microwave losses at that time are compared with transmission loss increases Δα at a wavelength of 1.24 μm, which were measured after the sample was left in a hydrogen atmosphere at one atm.

As is apparent from FIG. 10, when the microwave dielectric loss exceeds 1.4%, the transmission loss increase Δα becomes 0.02 dB/km or less. The hydrogen resistance characteristics Δα representing the hermetic properties of the carbon film become very small, and it is found that this monitor method satisfactorily reflects the characteristics of the carbon film. In addition, with this monitor method, when the dielectric loss is 1.4% or more, the carbon film is excellent in hermetic properties.

Figure 11:
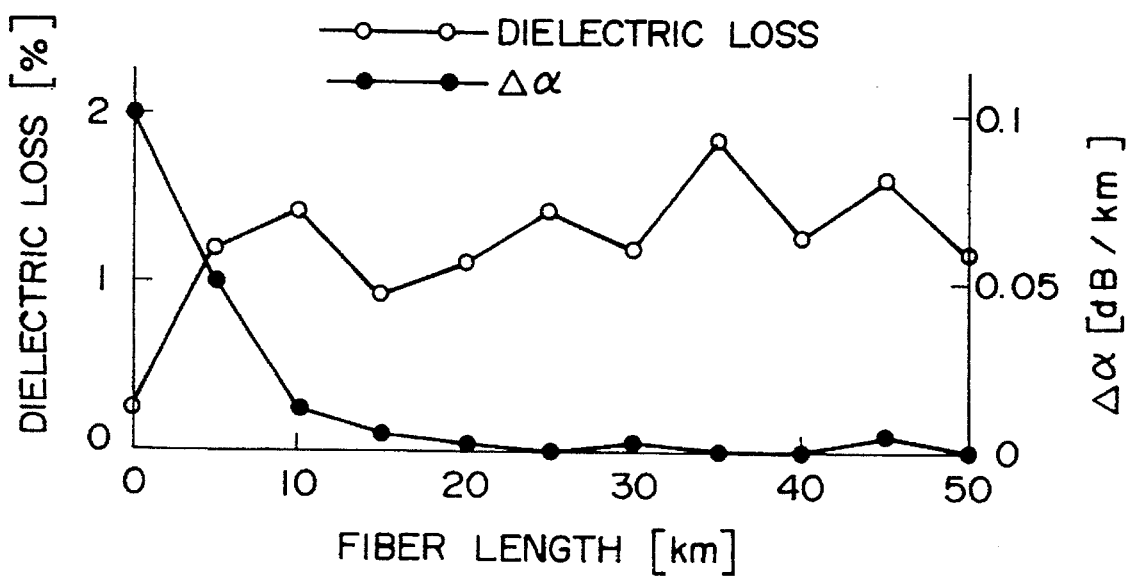
FIG. 11 is a graph showing the experimental result of the comparative example.

As a comparative experiment, the apparatus shown in FIGS. 9A and 9B and the same carbon-coated optical fiber were used for monitoring, and a result shown in FIG. 11 was obtained. With this method, even after the fiber length exceeds 10 km, variations in dielectric loss are very large. For this reason, the characteristics of the carbon film cannot be monitored with a certain threshold. This means that the signal level is very low, and the influence of the noise level cannot be ignored.

Figure 12:
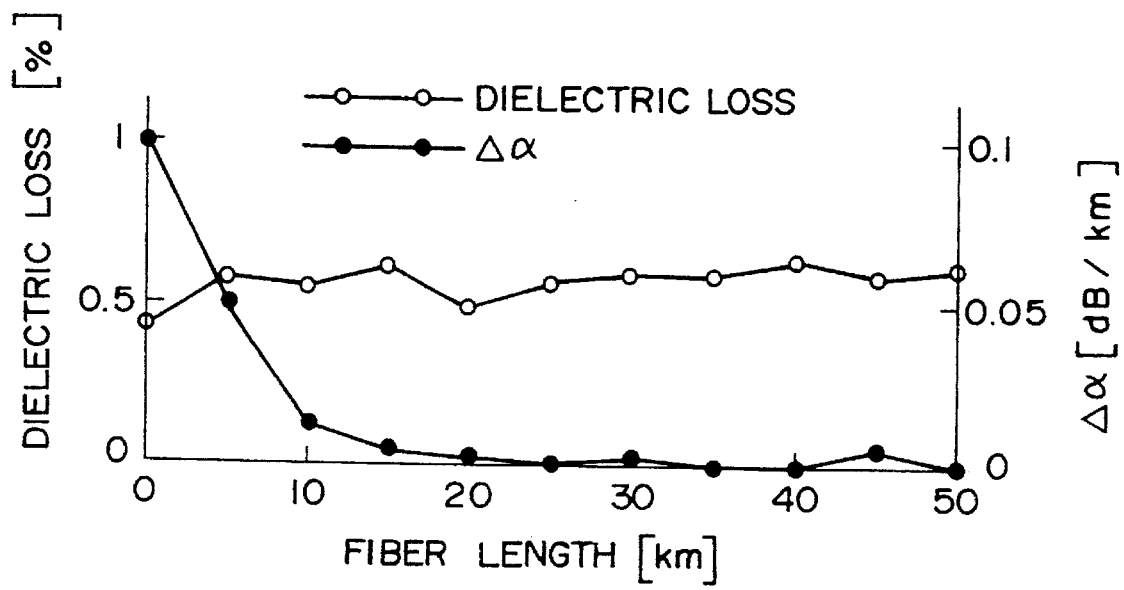
FIG. 12 is a graph showing the experimental result of an apparatus using a coaxial cable.

The apparatus shown in FIG. 7 was used to measure the same sample while replacing the elements except for the optical fiber guide hole with coaxial cables, and a result shown in FIG. 12 was obtained. Since the coaxial cable itself has a larger loss than that of the waveguide, the signal becomes weak. For this reason, a large difference is not detected independently of the presence/absence of the carbon film. In addition, the influence of noise is considered to be large.

Figure 13:
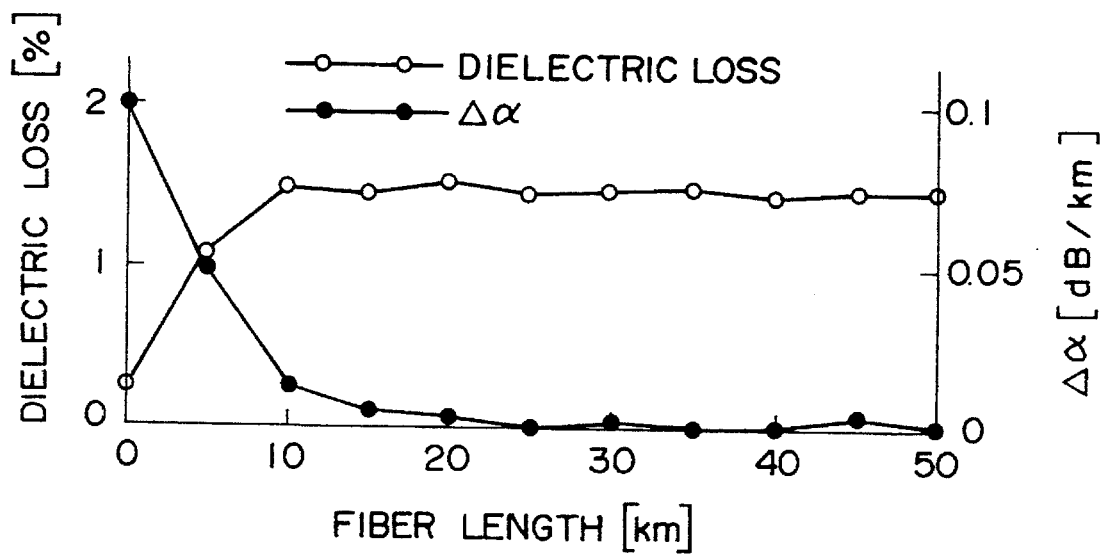
FIG. 13 is a graph showing the experimental result of the apparatus using the cavity resonator.

FIG. 13 shows an experimental result obtained when the circuit having the fiber guide hole was replaced with the cavity resonator shown in FIG. 5. In this experiment, the same carbon-coated optical fiber sample was used. As compared to the conventional apparatus, the microwave dielectric losses are stably output, as in the result in FIG. 10. Additionally, the noise level is low, and very stable outputs are obtained.

As is apparent from these experimental results, with the measuring method using the monitoring apparatus of the present invention, a microwave dielectric loss caused by the carbon film is directly obtained. For this reason, the dielectric loss is detected at a high sensitivity. In addition, because of the bridge circuit, the influence of noise can be minimized. Furthermore, the characteristics of the carbon film is monitored at a high sensitivity. Therefore, in a carbon-coated optical fiber having a carbon film formed under a condition that a microwave loss caused due to the dielectric loss is 1.4% or more as a threshold, the carbon film has very stable and excellent characteristics.

Figure 8:
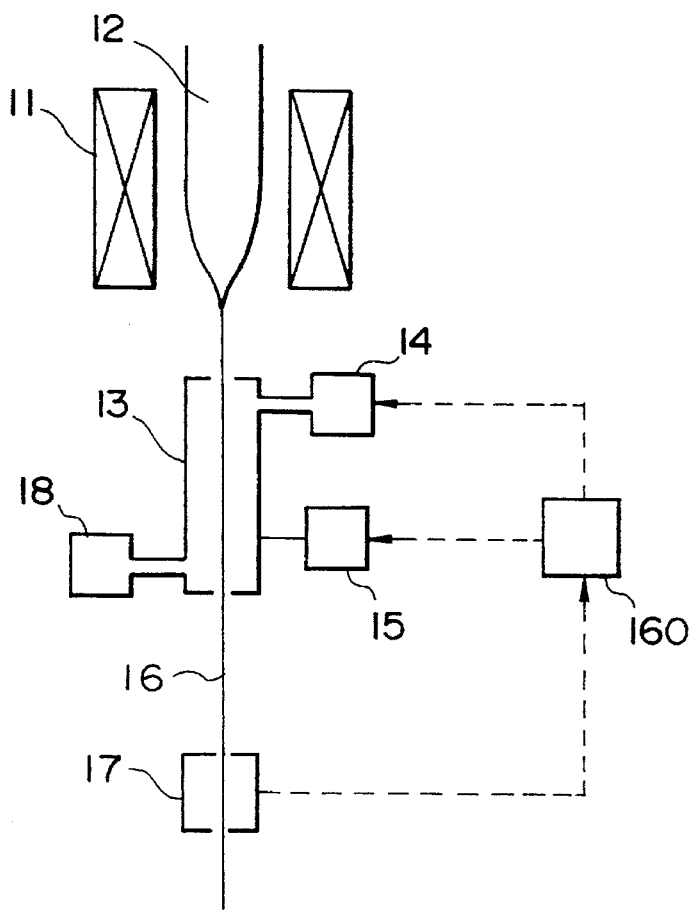
FIG. 8 is a view schematically showing the apparatus shown in FIG. 2.

FIG. 8 is a view schematically showing the arrangement of the embodiment in which the monitor method described in FIG. 7 is used to manufacture an optical fiber. Referring to FIG. 8, the apparatus has: the drawing furnace 11, the reaction furnace 13, a material supply unit 14, the reaction furnace elevator 15, the microcomputer 160, the carbon film monitoring apparatus 17, and the exhaust pump 18. The preform 12 is heated in the drawing furnace 11 and is drawn into a bare optical fiber. The reaction furnace 13 is arranged immediately below the drawing furnace 11. Source gases are supplied from the material supply unit 14 to the reaction furnace 13. A carbon film is formed on the surface of the bare optical fiber by CVD reaction, thereby manufacturing a carbon-coated optical fiber. The carbon film monitoring apparatus 17 uses a branching bridge circuit by the same microwave circuit as described in FIG. 7. A detection output from the carbon film monitoring apparatus 17 is supplied to the microcomputer 160. The microcomputer 160 controls the material supply unit 14 on the basis of the received data to control the flow rates of the source gases, thereby forming a carbon film with predetermined characteristics. The reaction furnace elevator 15 adjusts the position of the reaction furnace 13 in the longitudinal direction of the optical fiber. The temperature of the optical fiber in the reaction furnace 13 changes depending on the position of the reaction furnace 13. Therefore, when the reaction furnace elevator 15 is controlled, the reaction conditions can be changed to adjust the characteristics of the to-be-formed carbon film. Both the material supply unit 14 and the reaction furnace elevator 15 may be controlled. Other reaction conditions may be controlled, as a matter of course. These processes are performed as a series of manufacturing processes. The manufactured carbon-coated optical fiber is wound on an appropriate drum.

Figure 14:
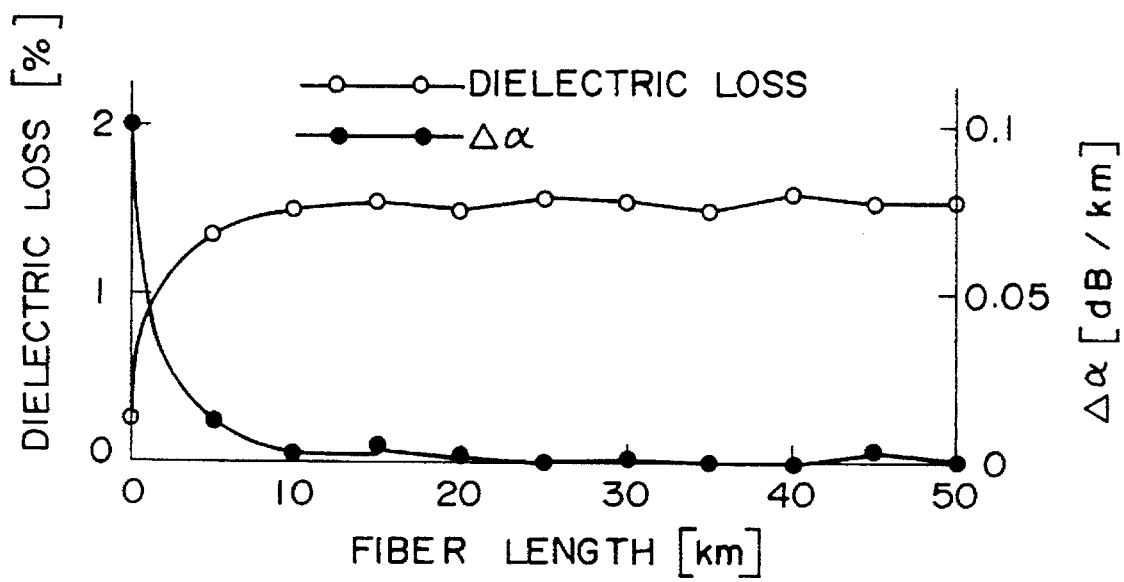
FIG. 14 is a graph showing the experimental result of an apparatus using a waveguide.

A detailed example will be described. A waveguide having one end sealed with a conductor plate was used as the optical fiber guide hole of the microwave circuit in the carbon film monitoring apparatus 17. At the start of manufacturing, a bare optical fiber was inserted in the optical fiber guide hole, and the adjustable reflection end was adjusted such that an output to the detector became zero. Thereafter, the source gases were supplied from the material supply unit 14 to form a carbon film. Immediately after supply of the source gases was started, monitor of an output from the detector of the carbon film monitoring apparatus 17 was started. The microcomputer 160 controlled the flow rates of the source gases in the material supply unit 14, or the reaction furnace elevator 15 in accordance with the monitored value of a microwave loss at that time. The control was performed such that the flow rates were increased or the reaction furnace was moved upward if the microwave dielectric loss was 1.4% or less. FIG. 14 shows the experimental result in which the dielectric losses of the carbon-coated optical fiber manufactured under this control are compared with transmission loss increases $\Delta\alpha$ at a wavelength of 1.24 μm, which were measured after the sample was left in a hydrogen atmosphere at one atm.

As is apparent from FIG. 14, when the microwave dielectric loss exceeds 1.4%, the transmission loss increase $\Delta\alpha$ becomes 0.02 dB/km or less. The hydrogen resistance characteristics $\Delta\alpha$ representing the hermetic properties of the carbon film become very small. The carbon film of the optical fiber manufactured by this monitor method has stable characteristics. In addition, failures in the optical fiber at the start can be decreased.

Figure 15:
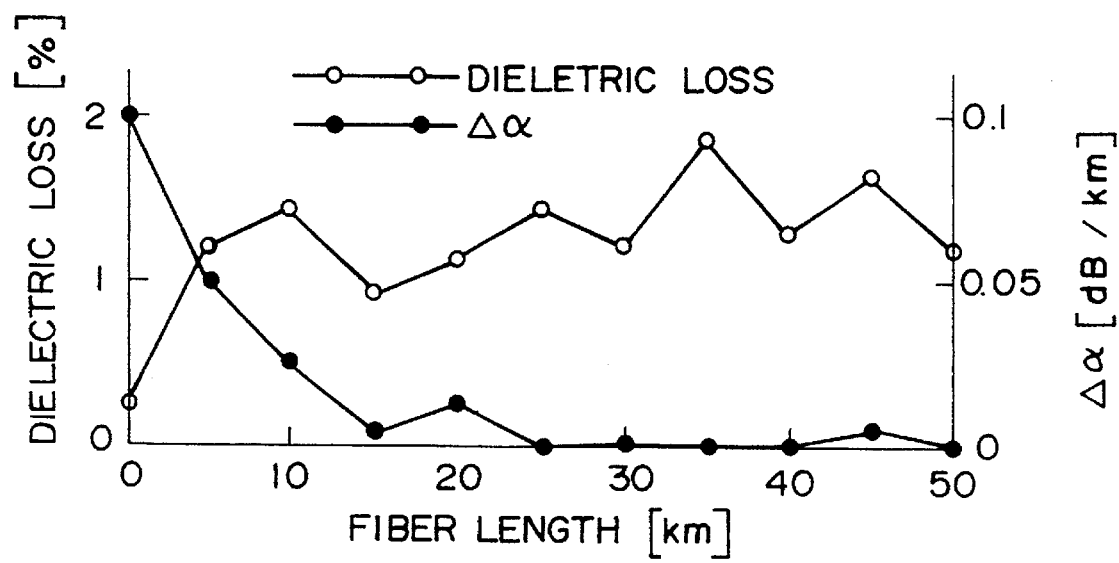
FIG. 15 is a graph showing the experimental result of the comparative example.

As a comparative experiment, the apparatus shown in FIGS. 9A and 9B was used to manufacture a carbon-coated optical fiber under the same conditions, and a result shown in FIG. 15 was obtained. With this method, even after the fiber length exceeds 10 km, variations in dielectric loss are very large. For this reason, a long time is required until the characteristics of the carbon film are stabilized. Since the signal level is very low, and the influence of the noise level cannot be ignored, feedback to the manufacturing conditions is intermittently performed.

Figure 16:
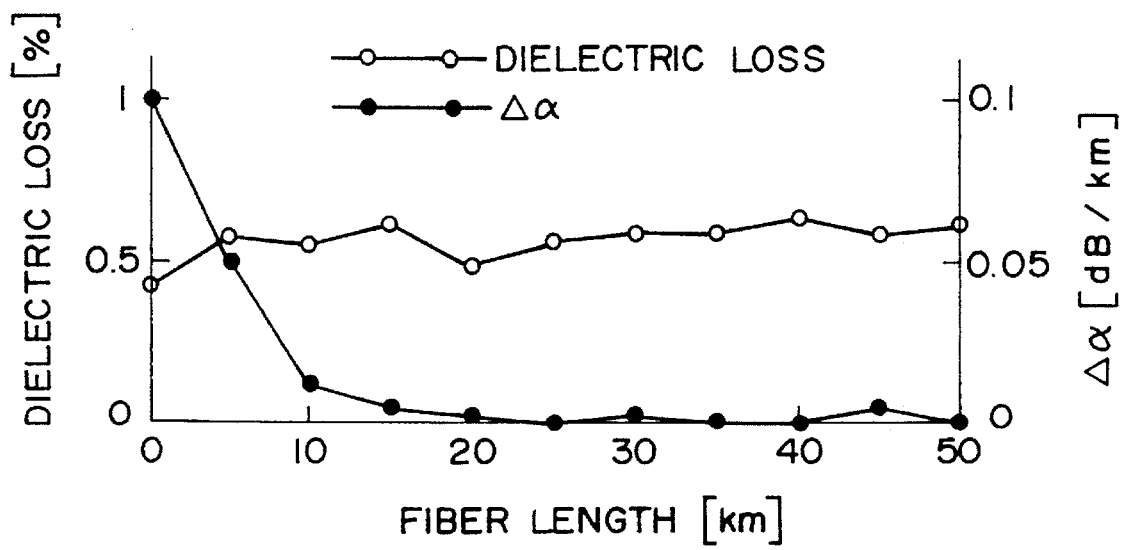
FIG. 16 is a graph showing the experimental result of the apparatus using the coaxial cable.

The apparatus shown in FIG. 7 was used to measure the same sample while replacing the elements except for the optical fiber guide hole of the waveguide 4 with coaxial cables, and a result shown in FIG. 16 was obtained. Since the coaxial cable itself has a larger loss than that of the waveguide, the signal becomes weak. For this reason, the detection level in the presence of the carbon film has a small difference from that in the absence of the carbon film. In addition, the influence of noise is considered to be large.

Figure 17:
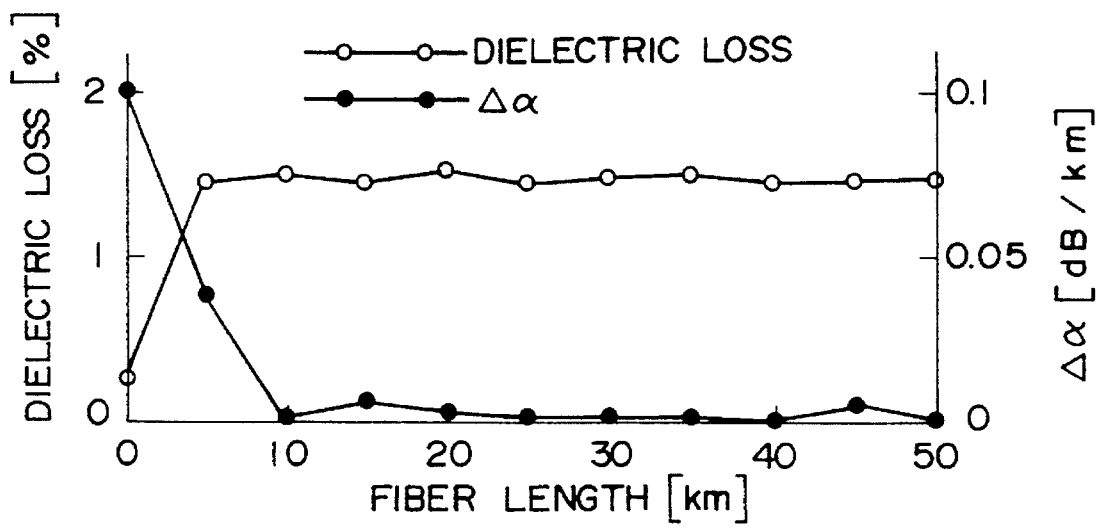
FIG. 17 is a graph showing the experimental result of the apparatus using the cavity resonator.

FIG. 17 shows an experimental result obtained when the circuit having the fiber guide hole was replaced with the cavity resonator. In this experiment, a carbon-coated optical fiber was manufactured under the same conditions. As compared to the conventional apparatus, the microwave dielectric losses are stably output, as in the result in FIG. 14. Additionally, the noise level is low, and very stable outputs are obtained.

As is apparent from the experimental results, according to the manufacturing method of the present invention, a bridge circuit capable of directly obtaining a microwave dielectric loss caused by a carbon film at a high sensitivity is used to control the carbon film formation conditions while the threshold of the dielectric loss value is set to 1.4%. Therefore, a carbon-coated optical fiber having stable characteristics is manufactured at a high yield.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for measuring characteristics of a carbon coated fiber, comprising:
   (a) a magic tee having first, second, third and fourth passages through which a microwave can travel;
   (b) a waveguide communicating with said first passage, said waveguide having a hole through which said fiber can pass;
   (c) an adjustable short plunger having a waveguide communicating with said second passage, said plunger having a cavity with an adjustable volume;
   (d) an analyzer for introducing microwaves into said third passage via an input terminal and detecting microwaves from said fourth passage via an output terminal.

2. An apparatus for measuring characteristics of a carbon coated fiber, comprising:
   (a) a magic tee having first, second, third and fourth openings;
   (b) a waveguide communicating with said magic tee through said first opening, said waveguide having a hole through which said carbon coated fiber can pass;
   (c) an adjustable short plunger having a waveguide communicating with said magic tee through said second opening, said plunger having a cavity with an adjustable volume; and
   (d) an analyzer for introducing microwaves into said magic tee through said third opening via an input terminal and collecting microwaves from said magic tee through said fourth opening via an output terminal.

3. An apparatus for measuring characteristics of a carbon coated fiber, comprising:
   (a) a magic tee having:
      a first opening,
      a second opening,
      a third opening through which microwaves are introduced, and
      a fourth opening through which microwaves exit;
   (b) a first waveguide communicating with said magic tee through said first opening, said first waveguide having a hole through which said carbon coated fiber can pass; and
   (c) an adjustable short plunger having a cavity with adjustable volume, said plunger communicating with said magic tee through said second opening.

4. An apparatus according to claim 3, further comprising:
   a winding up reel for winding up the carbon coated fiber passing through said hole, said reel positioned below said hole; and
   a first regulation means for sandwiching the carbon coated fiber prior to said carbon coated fiber passing through said hole and limiting movement of said carbon coated fiber to an axial direction of said hole, said first regulation means positioned above said hole.

5. An apparatus according to claim 4, further comprising:
   a second regulation means for sandwiching said carbon coated fiber after said object passes through said hole and limiting movement of said carbon coated fiber to an axial direction of said hole, said second regulation means positioned between said hole and said winding up reel.

6. An apparatus according to claim 3, further comprising:
   a circulator having first, second, and third apertures, said circulator connected to said magic tee through said second aperture by a connecting waveguide;
   an input waveguide communicating with said circulator through said first aperture of said circulator;
   an input terminal attached to said input waveguide, said input terminal introducing microwaves into said input waveguide, said microwaves guided into said circulator through said first aperture of said circulator and guided into said third opening of said magic tee through said second aperture of said circulator via said connecting waveguide, said microwaves being branched by said magic tee,
   a second waveguide communicating with said circulator through said third aperture, said second waveguide having a first end and a terminal end, said first end abutting said third aperture, wherein microwaves reflected back from said magic tee are deflected by said circulator and introduced into said second waveguide; and
   a matched termination arranged in said second waveguide for absorbing microwaves irradiated on said matched termination, said matched termination positioned at said terminal end of said second waveguide.

7. An apparatus according to claim 6, further comprising:
   an output waveguide communicating with said magic tee through said fourth opening of said magic tee;
   an output terminal attached to said output waveguide wherein microwaves are collected; and
   an analyzer for supplying microwaves to said input terminal and extracting through said output terminal a signal related to characteristics of the carbon coated fiber.

8. An apparatus according to claim 3, said first waveguide having an inner wall with a silver film disposed thereon, said adjustable short plunger having an inner wall with a silver film disposed thereon, wherein said carbon is arranged between said silver films.

9. An apparatus for measuring characteristics of a carbon coated fiber, comprising:
   (a) a magic tee including:
      a first opening,
      a second opening,
      a third opening through which a microwave can be introduced, and
      a fourth opening through which a microwave can be ejected;
   (b) a cavity resonator having an upper and a lower surface, said surfaces substantially parallel to one another, said upper surface having a first hole through which said carbon coated fiber passes, said lower surface having a second hole through which said carbon coated fiber passes;
   (c) a waveguide connecting said magic tee with said cavity resonator through said first opening of said magic tee; and
   (d) an adjustable short plunger having a cavity with adjustable volume, said plunger communicating with said magic tee through said second opening of said magic tee.

10. A method of measuring characteristics of a carbon coated fiber, comprising the steps of:

(a) preparing an apparatus including: a magic tee having first, second, third and fourth openings, a waveguide communicating with said magic tee through said first opening, said waveguide having a hole, an adjustable short plunger having a cavity with adjustable volume, said adjustable short plunger communicating with said magic tee through said second opening;

(b) introducing microwaves into said magic tee through said third opening;

(c) inserting said carbon coated fiber into said waveguide through said hole in said waveguide;

(d) adjusting said adjustable short plunger while collecting microwaves ejected from said fourth opening of said magic tee.

11. A method of manufacturing an optical fiber, comprising the steps of:

(a) coating a glass fiber with carbon;

(b) evaluating characteristics of said carbon-coated fiber, wherein step (b) includes the further steps of:
introducing microwaves into a magic tee through an opening in said magic tee, said magic tee branching said microwaves such that microwaves branched in one direction are introduced into a waveguide through an opening of said magic tee and microwaves branched in an opposite direction are introduced into an adjustable short plunger through another opening of said magic tee;
inserting said carbon-coated fiber into said waveguide via a hole in said waveguide;
adjusting said adjustable short plunger while collecting microwaves ejected from said magic tee;

(c) evaluating characteristics of a fiber without a carbon coating, wherein step (c) includes the steps of:
introducing microwaves into said magic tee;
inserting said fiber without a carbon coating into said waveguide through said hole of said waveguide; and
adjusting said adjustable short plunger while collecting microwave ejected from said magic tee.

12. A method according to claim 11, further comprising the step of covering said carbon-coated fiber with a resin between step (a) and step (b).

* * * * *